United States Patent
Bean

(10) Patent No.: US 6,254,451 B1
(45) Date of Patent: Jul. 3, 2001

(54) GAME CALL WITH VOLUME CONTROL

(75) Inventor: Ron M. Bean, Cedar Rapids, IA (US)

(73) Assignee: Hunter's Specialties, Inc., Cedar Rapids, IA (US)

( * ) Notice: Subject to any disclaimer, the term of this patent is extended or adjusted under 35 U.S.C. 154(b) by 0 days.

(21) Appl. No.: 09/342,561

(22) Filed: Jun. 29, 1999

(51) Int. Cl.[7] .................................................. A63H 5/00
(52) U.S. Cl. ......................... 446/207; 446/206; 446/202
(58) Field of Search ................................... 446/202, 205, 446/206, 207, 208, 209; 84/350, 363, 364, 383 A

(56) References Cited

U.S. PATENT DOCUMENTS

| | | | |
|---|---|---|---|
| 2,056,623 | * 10/1936 | Scott | 446/206 |
| 2,505,141 | * 4/1950 | Pitts | 446/205 |
| 2,506,039 | * 5/1950 | Sivitz | 446/205 |
| 2,782,558 | 2/1957 | Harley . | |
| 2,915,851 | * 12/1959 | Ringman | 446/206 |
| 2,969,611 | 1/1961 | Warren, Jr. . | |
| 3,583,094 | 6/1971 | Tribell . | |
| 3,811,221 | 5/1974 | Wilt . | |
| 3,815,283 | 6/1974 | Piper . | |
| 3,968,592 | 7/1976 | Piper . | |
| 4,048,750 | 9/1977 | Wolfe . | |
| 4,050,186 | 9/1977 | Shults et al. . | |
| 4,280,299 | * 7/1981 | Oka | 446/206 |
| 4,335,539 | 6/1982 | Jones . | |
| 4,551,112 | 11/1985 | Johnson . | |
| 4,576,584 | 3/1986 | Hill . | |
| 4,950,198 | * 8/1990 | Repko, Jr. | 446/207 |
| 4,976,648 | * 12/1990 | Meline | 446/207 |
| 5,360,413 | 11/1994 | Leason et al. . | |
| 5,549,498 | * 8/1996 | Kirby | 446/193 |
| 5,593,054 | 1/1997 | Glynn . | |
| 5,735,725 | 4/1998 | Primos . | |
| 5,803,785 | * 9/1998 | Primos, Jr. et al. | 446/207 |

* cited by examiner

Primary Examiner—Sam Rimell
(74) Attorney, Agent, or Firm—Simmons, Perrine, Albright & Ellwood PLC

(57) ABSTRACT

A volume variable game call having a rotary air valve disposed between the reed section of the call and the horn section of the call.

8 Claims, 3 Drawing Sheets

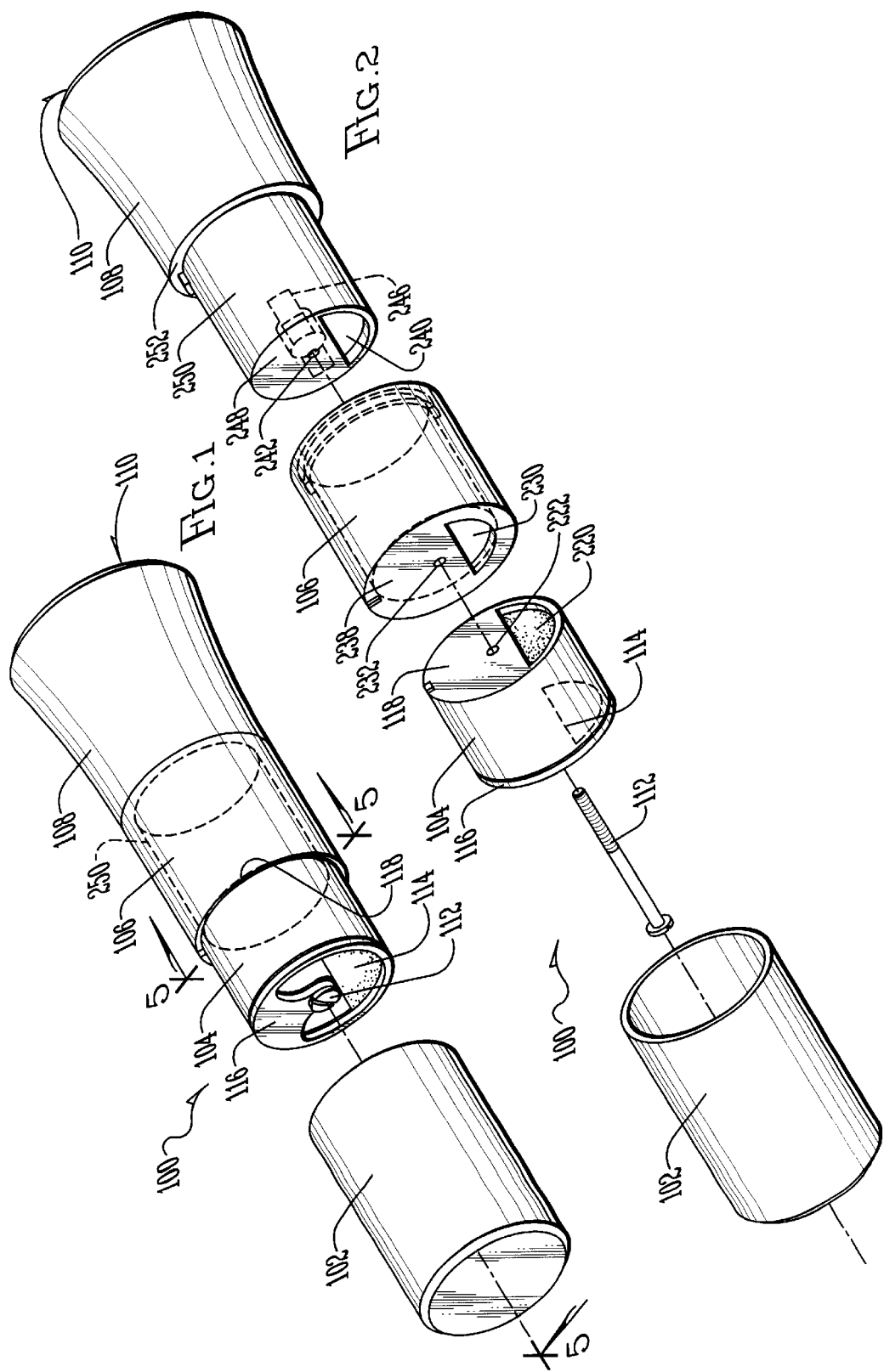

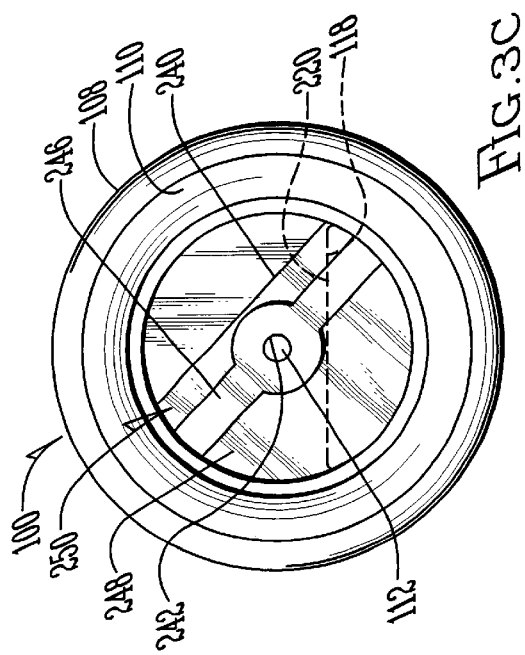
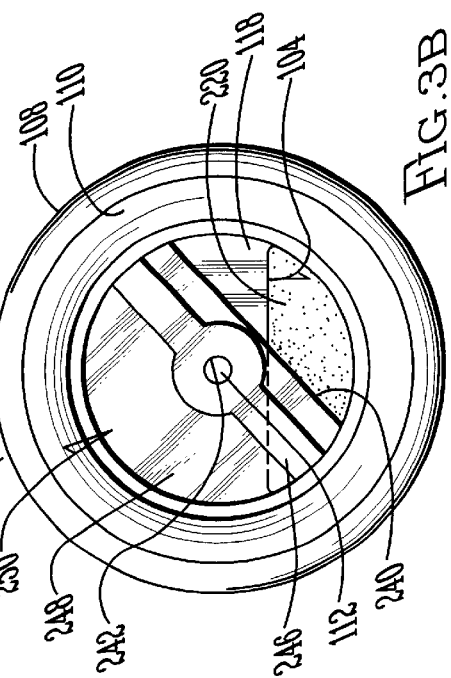
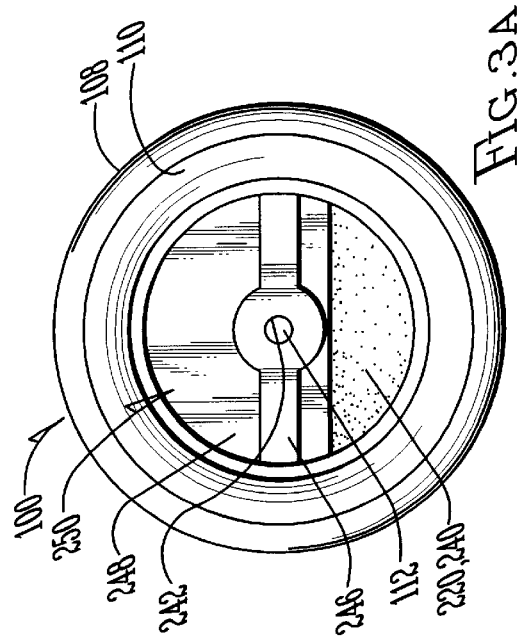

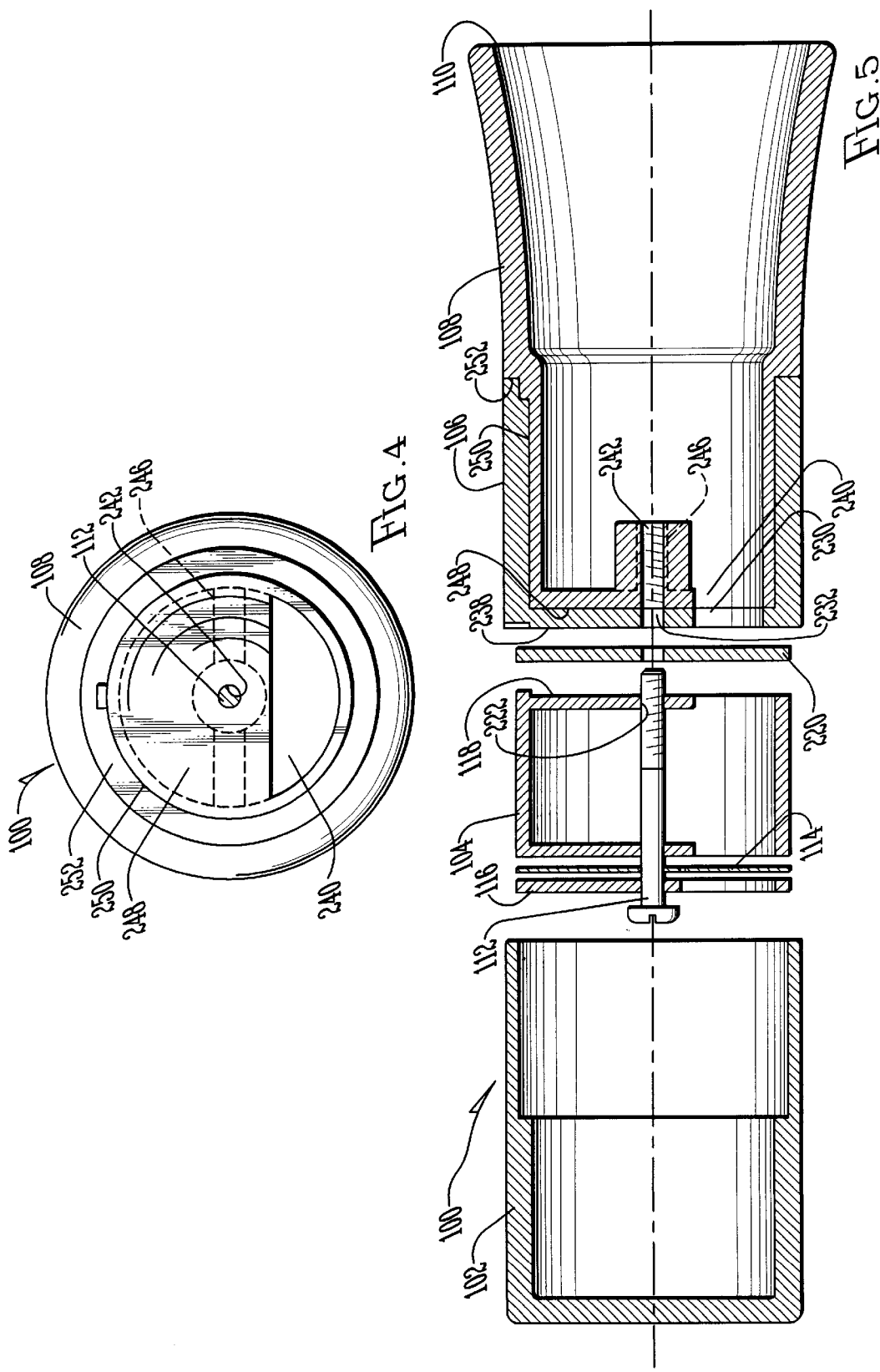

GAME CALL WITH VOLUME CONTROL

FIELD OF THE INVENTION

The present invention generally relates to game calls, and even more particularly relates to hand-operated game calls for producing calls with variable volume levels.

BACKGROUND OF THE INVENTION

In the past, designers of game calls have endeavored to provide more realistic sounding calls. Some calls require extensive skill before they can be made to produce realistic sounds, while other calls, especially lip-blown tube calls, often require considerable hand movement around the end of the tube to change pitch, tone and volume. Some calls have incorporated a bellows to eliminate the requirement of blowing through the call.

While these calls may have advantages, they also have significant drawbacks.

Often a novice caller or a caller who wishes to refrain from the required cupping of hands etc. at the end of a lip-blown tube call, will resort to a hand-operated bellows call. However, these calls usually have a more limited range of realistic sounding calls that they can produce when compared with the more versatile and difficult to operate lip-blown calls.

Consequently, there exists a need for improvement of hand-operated bellows game calls with controls therein for varying the sound output.

SUMMARY OF THE INVENTION

It is an object of the present invention to provide an adjustable game call having realistic tones at variable volume levels.

It is a feature of the present invention to utilize a twisting airflow control valve inside the call.

It is an advantage of the present invention to provide a call which is easy to use and has a volume variability characteristic.

The present invention is a volume controllable game call which is designed to satisfy the aforementioned needs, provide the previously stated objects, include the above-listed features and achieve the already articulated advantages. The present invention is carried out in an "expertise-less" manner in a sense that the high level of expertise which was often required by an operator of a game call to generate sounds at varying sound levels has been greatly reduced.

Accordingly, the present invention is a game call having an internal air valve therein for regulating permissible airflow through the call.

BRIEF DESCRIPTION OF THE DRAWINGS

The invention may be more fully understood by reading the following description of the preferred embodiments of the invention, in conjunction with the appended drawings wherein:

FIG. 1 is a partially exploded perspective view of a portion of a game call of the present invention, wherein the dotted lines show the alignment of the exploded parts.

FIG. 2 is a simplified exploded perspective diagram of a game call of FIG. 1, wherein the dotted lines show the alignment of the exploded parts.

FIG. 3A is an end view of the game call of FIG. 1, in which the volume control is in a fully open position.

FIG. 3B is an end view of the game call of FIG. 1, in which the volume control is in a partially open position.

FIG. 3C is an end view of the game call of FIG. 1, in which the volume control is in a fully closed position.

FIG. 4 is an end view of the horn section of the present invention taken from the opposite end from FIGS. 3A, 3B, and 3C.

FIG. 5 is a cross-sectional view taken on line 5—5 of FIG. 1.

DETAILED DESCRIPTION

Now referring to the drawings wherein like numerals refer to like matter throughout, and more specifically to FIGS. 1 and 2, which are partially exploded perspective views, of the present invention, generally designated 100, showing a bellows 102, a sound chamber 104 with a proximal sound chamber end 116 and a distal sound chamber end 118. and a screw 112 Disposed on distal sound chamber end 118 is distal diaphragm 220 and distal sound chamber screw hole 222. The opposing position of proximal diaphragm 114 with respect to distal diaphragm 220 is a well-known arrangement as used in prior art dual diaphragm calls. A stationary sleeve 106 is preferably coupled to sound chamber 104 in a rigid manner with no relative motion therebetween during operation. Stationary sleeve 106 has a proximal stationary sleeve opening 230 (which is aligned with distal diaphragm 220), a proximal stationary sleeve blocking plate 238, and a proximal stationary sleeve screw hole 232. Other than proximal stationary sleeve blocking plate 238 with proximal stationary sleeve screw hole 232 therein, stationary sleeve 106 is preferably a hollow tube. A horn 108 with a horn insert 250 coupled thereto or integrally a part thereof, is disposed in and adjacent to stationary sleeve 106. Horn insert 250 is inserted into the stationary sleeve 106 so that proximal horn insert opening 240 and proximal horn insert blocking plate 248 are brought next to proximal stationary sleeve opening 230 and proximal stationary sleeve blocking plate 238. Proximal horn insert blocking plate 248 has a proximal horn insert lateral stabilizing ridge 246 and a proximal horn insert screw hole 242. Additionally, proximal horn edge 252 is brought into contact with stationary sleeve 106 when horn insert 250 is fully inserted in stationary sleeve 106.

Now referring to FIGS. 3A, 3B, and 3C, there are shown several end views of the present invention taken from horn distal end 110 looking through the call 100 to distal diaphragm 220 and distal sound chamber end 118. In FIG. 3A, the proximal horn insert opening 240 is aligned with the distal diaphragm 220 so as to allow full sound generation by the call 100. In FIG. 3B, the proximal horn insert opening 240 is twisted to an intermediate position, so that only a portion of distal diaphragm 220 is aligned. In such cases, the volume of the sound generated is significantly reduced. In FIG. 3C, there is shown a configuration of proximal horn insert opening 240 and distal diaphragm 220 not shown when in a closed position, such that the volume is at its lowest point, because the proximal horn insert opening 240 is aligned with distal sound chamber end 118 and not with distal diaphragm 220. It may be desirable to place limitations on how far the horn insert 250 can be rotated by including a stop, post or other rotational limiting feature. Dimples, detents or other features may be included which provide a tactile notice to the operator as the horn insert 250 is rotated past predetermined positions. The precise size, dimension and location of such features for producing tactile notification of and limitation of rotational position, are matters of designer's choice and are not discussed in detail because they will be determined by the particular need for the particular call designed.

Now referring to FIG. 4, there is a view of the horn 108 and horn insert 250 combination of the present invention, taken from the direction of proximal horn insert blocking plate 248. The semi-circular lines are drawn to highlight the difference between proximal horn insert blocking plate 248 and proximal horn insert opening 240. The actual call may or may not include any such ridges or markings.

Now referring to FIG. 5, there is shown a cross sectional partially exploded view of the call of FIG. 1, which further shows that sound chamber 104 preferably has several pieces associated with the retention of distal diaphragm 220 and proximal diaphragm 114.

In operation, the apparatus of the present invention could function as follows:

The bellows 102 is manipulated to produce airflow through proximal diaphragm 114, through sound chamber 104 and out distal diaphragm 220, if proximal horn insert opening 240 is aligned with distal diaphragm 220. If the operator wishes a lower volume of sound, then horn insert 250 is rotated for only partial alignment between proximal horn insert opening 240 and distal diaphragm 220. When no sound or very low volume sound is desired, then horn insert 250 is rotated so that proximal horn insert opening 240 is aligned with distal sound chamber end 118 and not with distal diaphragm 220. The horn 108 then permits propagation of whatever sound is generated through distal diaphragm 220 and proximal horn insert opening 240 while focussing its direction of propagation as desired.

The volume control valve of the present invention has been described in conjunction with a dual diaphragm bellows-operated call as often is used for turkey calls, because it is believed that many of the advantages of the present invention will be maximized when used in such calls. However, it should be understood that the benefits of the volume control of the present invention can be also enjoyed when applied to non-dual diaphragm calls and non-bellows calls, such as the ubiquitous lip-blown tube call.

It is thought that the apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred exemplary embodiment thereof.

I claim:

1. A game call comprising:
    a reed tube having a reed tube air inlet end and a reed tube air exit end, a reed assembly, disposed in said reed tube, for generating sound representative of an animal when air flows over the reed assembly;
    a horn, having a proximal end coupled to said reed tube and a distal end having a free end surface;
    an adjustable airflow valve disposed between said reed tube air inlet end and said horn, for controlling airflow across the reed assembly; and
    wherein said reed assembly includes a plurality of diaphragms.

2. A game call of claim 1 further comprising a bellows attached to said air inlet end.

3. A game call of claim 2 wherein said adjustable airflow valve includes a rotating disk having an air permeable portion and an air non-permeable portion.

4. A game call of claim 3 wherein said rotating disk includes means for providing tactile monitoring of an alignment characteristic of said rotating disk with respect to one of said plurality of diaphragms.

5. A game call of claim 4 wherein said air non-permeable portion has predetermined size and shape characteristics to block airflow through one of said plurality of diaphragms at a predetermined alignment orientation of said rotating disk with respect to one of said plurality of diaphragms.

6. A game call of claim 4 wherein said air permeable portion has predetermined size and shape characteristics to freely permit airflow through one of said plurality of diaphragms at a predetermined alignment orientation of said rotating disk with respect to one of said plurality of diaphragms.

7. A game call of claim 6 wherein said rotating disk is caused to rotate with respect to one of said plurality of diaphragms when said horn is twisted with respect to said reed tube.

8. A game call of claim 6 wherein said rotating disk is caused to rotate with respect to one of said plurality of diaphragms when an air valve tube disposed between said horn and said reed tube is caused to rotate with respect to said reed tube.

* * * * *